United States Patent Office 3,510,247
Patented May 5, 1970

---

3,510,247
MODIFICATION OF CELLULOSIC MATERIALS WITH TERTIARY BIS-ACRYLAMIDES
Giuliana C. Tesoro, Dobbs Ferry, N.Y., assignor to J. P. Stevens & Co., Inc., New York, N.Y., a corporation of Delaware
No Drawing. Filed Apr. 1, 1964, Ser. No. 356,639
Int. Cl. D06m *13/34*
U.S. Cl. 8—116.2                                11 Claims

---

ABSTRACT OF THE DISCLOSURE

Chemical modification of cellulosic materials under conditions of alkaline catalysis with a tertiary bis- acrylamide represented by the structural formula:

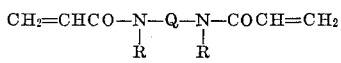

wherein Q is a divalent organic radical and R is a lower alkyl group which may, in conjunction with the Q radical, form a heterocyclic group with the nitrogen.

---

The present invention relates to the chemical modification of cellulosic materials in order to impart desirable properties thereto, and more particularly, to methods for crosslinking cellulosic textile materials and products produced thereby.

Many attempts have been made in the past to improve or change the properties and characteristics of cellulosic materials by chemical modification employing polyfunctional compounds capable of reaction with the hydroxyl groups of the cellulose molecules. It is widely known, for example, that soluble cellulosic materials can be rendered insoluble by such crosslinking reactions and that the water resistance of cellulosic fibers can be greatly increased by similar reactions. Other desirable properties such as dimensional stability and crease recovery particularly with respect to fabrics consisting wholly or in part of cellulosic fibers can also be obtaned by the foregoing methods. Although many reactants and processes for crosslinking cellulosic materials have become known in recent years including some which have achieved commercial importance, certain objectionable features and drawbacks have generally accompanied the prior known methods.

Among the crosslinking agents that have been widely employed in order to improve the dimensional stability, resilience, crease recovery, and wash and wear properties of cellulosic textiles are certain compounds containing activated olefinic groups which react with the hydroxyl groups of the cellulose molecules under alkaline conditions. Representative of these polyfunctional activated compounds are divinyl sulfone and N,N'methylene bis-acrylamide.

For several reasons these materials have not been completely successful and it has been noted for example that N,N'methylene bis-acrylamide yields poor results when used for crosslinking cellulosic textiles. The solubility of this compound in water and many oragnic solvents is very low, and complex procedures are necessary for applying this crosslinking agent to fabric. Moreover, because this compound generally requires severe reaction conditions involving baking or curing for prolonged periods in the presence of alkaline catalysts in order to induce the desired reaction, objectionable side reactions take place in addition to, or in preference to, the desired crosslinking reaction. Sensitive cellulosic fibers are susceptible to degradation and discoloration caused by the severe reaction conditions referred to above. Rather than being benefitted by the foregoing treatments, the treated textiles are often imparied thereby.

A further disadvantage in the N,N'methylene bis-acrylamide crosslinking agents is caused by the presence of the —CONH— groups which, after treatment of the cellulosic textile, result in a tendency in the treated material to retain chlorine from conventional hypochlorite bleaching solutions used in processing or laundering fabric with attendant severe weakening of the fabric caused by the presence of the chlorine and hydrochloric acid formed from it.

The development of improved methods for chemical modification of cellulosic materials, particularly the crosslinking cellulosic textile materials has long been recognized as an important objective in the textile industry in order to eliminate or reduce some or all of the objectionable features of prior known reactants and processes. It is seen from the foregoing that compounds containing two acrylamide groupings such as N,N'methylene bis-acrylamide have not been completely satisfactory or desirable as crosslinking agents for cellulosic textiles. Moreover, other compounds are characterized by poor stability and solubility in the most commonly used solvents, all of which represents severe drawbacks and limitations on commercial operations in the textile industry.

Accordingly, it is an object of the present invention to provide a method for the chemical modification of cellulosic materials which avoids the shortcomings and disadvantages of the prior known methods and compositions.

It is a further object of the present invention to provide methods for the chemical modification of cellulosic textile fabrics in order to impart desirable properties such as crease recovery, dimensional stability as well as wash and wear properties.

It is a further object of the present invention to provide methods for crosslinking cellulosic textile materials employing compounds characterized by good solubility, stability and which avoid undesirable side reactions and effects.

It is a further object of the present invention to provide crosslinked cellulosic textile materials which are stable to conditions encountered in common laundering practices.

According to one feature of the present invention whereby the foregoing objects are achieved, the method for the chemical modification of cellulosic materials is carried out by applying certain bis-acrylamide crosslinking agents to the said cellulosic materials in the presence of an alkaline catalyst. The crosslinking agents are represented by the structural formula:

(I) 

wherein Q is a divalent organic radical containing two tertiary nitrogen atoms, which nitrogen atoms are connected to the —CO— groups by carbon-to-nitrogen bonds. The bis-acrylamide crosslinking agents of the present invention are further characterized by the fact that the nitrogen atoms of the amide groups are free of hydrogen atoms attached directly thereto and have greatly improved stability, solubility, reactivity and efficiency as compared with previously employed compounds.

Because of these properties, the bis-acrylamide crosslinking agents in which the reactive groups

are attached to tertiary nitrogen atoms are extremely effective crosslinking agents for cellulosic textile materials. When applied to cellulosic fabrics, the crosslinking agents used according to the present invention are capable of yielding fabrics of outstanding properties with respect to crease recovery, dimensional stability and wash and wear properties. An additional advantage of the present invention resides in the fact that the crosslinked textile products can be obtained under mild conditions which avoids undesirable side reactions such as polymerization of the reactants as well as undesirable effects on the fabrics such as degradation of the fibers or discoloration prevalent in prior known methods. Crosslinked textile materials produced according to the present invention are very stable to all conditions encountered in common laundering practices including exposure to alkaline detergents, acid scouring and particularly hypochlorite bleaching operations.

Other objects, features and advantages of the present invention will become apparent from the following detailed description thereof.

Representative compounds included within the scope of Formula I above are of the structure:

(II)  $CH_2=CHCO-N-R_1-N-COCH=CH_2$
            $\quad\quad\quad\quad\;\; |\quad\quad\; |$
            $\quad\quad\quad\quad\;\; R\quad\quad R$ wherein R is a lower alkyl group from 1 to 5 carbon atoms and $R_1$ is a divalent aliphatic radical. Examples of suitable divalent aliphatic radicals are:

—$C_mH_{2m}$— wherein $n$ has a value of 2 to 10,
—$C_nH_{2n-2}$— wherein $n$ has a value of 4 to 10,
—$(C_nH_{2n}O)_mC_nH_{2n}$— wherein $m$ has a value of 1 to 5 and $n$ has a value of 2 to 3,
—$C_nH_{2n-x}(OH)_x$— wherein $x$ has a value of 1 to 5 and $n$ has a value of 3 to 10, and

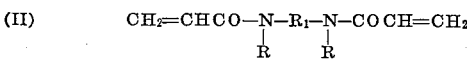

wherein $a$ and $b$ are integers with a value of 2 to 4.

Further examples of bis-acrylamide compounds suitable for the purposes of the present invention and included within the scope of Formula I are represented by the structural formula:

(III) 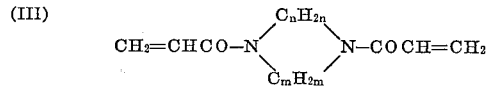

wherein $n$ and $m$ are integers with a value of 0 to 4 and where the sum of the integers $n+m$ is at least 1.

Specific examples of suitable crosslinking agents which come within the scope of the above formula and representative of the compounds which can be employed for purposes of the present invention as illustrated in the examples hereinafter but not considered limiting of the invention in any way are shown in the table below:

| Structure | Name |
|---|---|
| 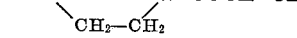 | Diacryloyl piperazine. |
| 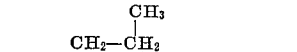 | Diacryloyl methyl piperazine. |
| 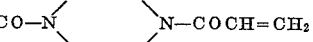 | Diacryloyl dimethyl piperazine. |
| 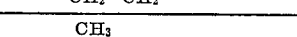 | 1,4 diacryloyl-bis N-methyl-amino cyclohexane. |
| $CH_2=CHCO-N-CH_2CH_2-N-COCH=CH_2$<br>$\quad\quad\quad\quad\quad\;\; |\quad\quad\quad\quad\quad\; |$<br>$\quad\quad\quad\quad\quad\; CH_3\quad\quad\quad\;\; CH_3$ | Diacryloyl-N,N′ dimethyl ethylene diamine. |
| $CH_2=CHCO-N-CH_2CH=CHCH_2-N-COCH=CH_2$<br>$\quad\quad\quad\quad\quad\;\; |\quad\quad\quad\quad\quad\quad\quad\quad |$<br>$\quad\quad\quad\quad\quad\; C_2H_5\quad\quad\quad\quad\quad\quad\; C_2H_5$ | Diacryloyl N,N′diethyl 1,4 diamino butene-2. |
| $CH_2=CHCO-NCH_2CH_2OCH_2CH_2N-COCH=CH_2$<br>$\quad\quad\quad\quad\quad |\quad\quad\quad\quad\quad\quad\quad\quad\quad |$<br>$\quad\quad\quad\quad\; CH_3\quad\quad\quad\quad\quad\quad\quad\; CH_3$ | Diacryloyl N,N′dimethyl 2,2′ diaminotehyl ether. |
| $CH_2=CHCO-N-CH_2CH-CH_2-N-COCH=CH_2$<br>$\quad\quad\quad\quad\quad\;\; |\quad\quad\; |\quad\quad\quad |$<br>$\quad\quad\quad\quad\quad CH_3\; OH\quad\quad CH_3$ | Diacryloyl N,N′ dimethyl 2-hydroxy-1,3 diamino-propane. |

Preparation of the compounds described above is set forth in copending application Ser. No. 301,875 filed Aug. 13, 1963, now abandoned, the complete disclosure of which is incorporated herein by reference.

In carrying out the present invention, the reaction between the cellulosic material and the bis-acrylamide crosslinking agents described above takes place in the presence of catalytic amounts of an alkaline compound sufficient to provide a pH of 7.5 or above in a 1 Normal aqueous solution thereof. The crosslinking reaction is generally driven to substantial completion in a few minutes at elevated temperature. The temperature at which the reaction takes place is not critical and resort to extremely high temperatures is unnecessary. Generally, it is preferred to carry out the reaction in the range of about 200° F. to 350° F., although th reaction will proceed slowly at ambient temperature. Swelling agents such as water or other solvents can be employed for purposes of the reaction although the reaction proceeds under anhydrous conditions as well.

Any convenient method can be employed in the application of the crosslinking reagents to the cellulosic material including spraying, padding, coating, brushing or dipping. Preferably the textile material is padded with an aqueous solution of the crosslinking agent.

The alkaline catalyst required for the reaction can be added to the crosslinking reagent solution and hence applied to the textile simultaneously with the reagent, or it may be applied to the textile in a separate step which can precede or follow application of the crosslinking reagent.

Concentration of crosslinking agent employed according to the present invention can vary within wide limits and is not a critical feature of the present invention. The required amount will depend on the particular cellulosic textile treated on the structure of the reagent, and in addition will be a function of the reaction conditions selected as well as the desired properties of the product. Generally, it has been found that reagent concentration varying between 3% to 25%, based on the weight of cellulose treated produces satisfactory results, although these concentrations can be varied. Concentrations of 5% to 15% are preferred.

Among the alkaline compounds that are effective in catalyzing the crosslinking reaction are the acetates, bicarbonates, carbonates, hydroxides, alkoxides, phosphates and meta-silicates of alkali metals such as sodium, potassium and lithium. Organic bases of equivalent strength such as tertiary amines and quaternary ammonium hydroxides can also be employed provided their boiling point is higher than the reaction temperature employed to carry out the reaction. A requisite for catalyst selection is that the alkaline compounds must not interfere with or deleteriously affect the course of the reaction or impart undesirable effects to the finished product. The alkalinity of the catalyst is such that a 1 Normal aqueous solution has a pH greater than about 7.5. As is the case with the crosslinking agent, the concentration of catalyst can also be varied depending on the amount of the crosslinking agent used, on the type of catalyst and the alkalinity of the catalyst as well as other reaction conditions.

As a general range, concentration of catalysts between about 0.3% and 10% by weight based on the weight of the cellulose treated, or between 10% and 40% based on the weight of the crosslinking agent applied, have been found to be effective for purposes of the present invention. Depending on other conditions and factors, these ranges may fluctuate.

Influenced by other reaction variables, the time and temperature required for the reaction can also differ widely and will be determined in part by the specific catalyst, textile and crosslinking agent employed. Reaction times of from about 2 minutes to about 20 minutes are satisfactory for reaction temperatures between 200° F. and 300° F., with lower temperatures requiring longer reaction periods and even shorter reaction times sufficing at temperatures of about 350° F. Various sources of heat can be employed for the curing step such as steam, forced draft ovens, radiant heating or any other conventional means commonly employed in the textile industry. Steaming is particularly effective when it is desired to maintain the cellulose fibers in a swollen configuration during the crosslinking reaction.

Secondary treating agents which are employed to produce specific effects in the treated textile can, if desired, be used in conjunction with the crosslinking agents of the present invention either by adding them to the treating bath or by applying them in separate processes. If the crosslinking reaction is carried out at high temperatures, it is advantageous to add a polymerization inhibitor such as sodium nitrite to the treating bath. Materials such as lubricants or softeners can be added in order to improve the handle, tear strength and abrasion resistance of the treated cellulose fabrics. Water repellents, sizing compounds and dyes can likewise be added to the solution containing the reactant and applied simultaneously with the crosslinking agents. Limiting the choice of these additional functional finishes is the fact that the chemical stability of the specific formulation should not be deleteriously affected thereby. Dyes and sizing compounds can be present on the textile material during the crosslinking reaction as described above either by using a previously dyed or sized textile or by adding a dye or sizing agent to the treating solution for the purpose of simultaneously crosslinking and dyeing and/or sizing. When the dye or sizing compound employed contains reactive groups capable of reaction with the crosslinking agent, it is possible to achieve permanent insolubilization of the dye or size by a reaction wherein one functional group of the crosslinking reagent combines with the cellulose molecule and the remaining functional group of the crosslinking agent reacts with the dye or sizing material.

Examples which follow below are illustrative of the present invention and are not considered limiting thereof in any way. The test results shown in the examples were obtained according to the following procedures.

Crease recovery—Monsanto Method—AATCC 66–1959
Tensile strength—Ravel Strip Method—ASTM D–39–59
Tear strength—Elmendorf Method—ASTM D–1425–59
Wash/wear rating—AATCC 88–1961T
Launderings—home type washer, 140° F. FAB detergent
Chlorine damage—AATCC–92–1962
Shrinkage—AATCC–96–1960T

EXAMPLE I

Three samples of 80 x 80 cotton printcloth fabric were padded with aqueous solutions containing 1,4 diacryloyl-2 methyl piperazine (DAMP) and alkaline catalysts in the following proportions:

Solution A—15% DAMP+2% KOH
Solution B—15% DAMP+4% KOH
Solution C—15% DAMP+5% KHCO$_3$
Solution D—7.5% DAMP+1% KOH
Solution F—7.5% DAMP+2.5% Na$_2$CO$_3$ The samples were dried, and subjected to heating under various conditions, as shown in the following table, then washed. The weight increase due to the treatment was determined, and the reaction yield was calculated from the weight increase. The properties of the treated samples are compared with those of an untreated control sample in the table.

| Sample treated w. solution | Heating conditions | Percent yield | (W+F) crease recovery orig., degrees | | (W+F) crease recovery after ldgs. w. bleach, degrees | |
|---|---|---|---|---|---|---|
| | | | Dry | Wet | Dry | Wet |
| A | Cured 5′ 325° F | 51 | 219 | 240 | 225 | 238 |
| | Steamed 10′ | 67 | 228 | 261 | 228 | 263 |
| | Steamed 30′ | 77 | 239 | 266 | 238 | 265 |
| B | Cured 5′ 325° F | 55 | 229 | 242 | 219 | 239 |
| | Steamed 10′ | 67 | 223 | 250 | 229 | 246 |
| | Steamed 30′ | 76 | 228 | 262 | 231 | 256 |
| C | Cured 5′ 325° F | 53 | 219 | 237 | 227 | 237 |
| | Steamed 10′ | 70 | 220 | 252 | 226 | 248 |
| | Steamed 30′ | 81 | 232 | 265 | 233 | 260 |
| D | Cured 5′ 325° F | 58 | 202 | 227 | 212 | 225 |
| | Steamed 10′ | 72 | 237 | 253 | 233 | 252 |
| | Steamed 30′ | 100 | 225 | 254 | 206 | 250 |
| F | Cured 5′ 325° F | 59 | 209 | 222 | 208 | 228 |
| | Steamed 10′ | 78 | 238 | 242 | 230 | 240 |
| | Steamed 30′ | 88 | 249 | 255 | 245 | 252 |
| | Untreated control | | 142 | 161 | 146 | 168 |

It is apparent from the data shown in the table that the improvement in crease recovery achieved as a result of the treatment is unchanged even after 10 machine launderings at 140° F. in presence of a strong chlorine bleaching solution. In addition, the warp tensile strength which, as expected, decreased from 58 lbs. to 40–44 lbs. as a result of the crosslinking treatment, did not decrease further as a result of the 10 launderings with chlorine bleach.

EXAMPLE II

A sample of cotton printcloth, padded with the Solution B of Example I was rolled smoothly on a coil, covered with a polyethylene sheet and allowed to react at room temperature for 24 hours without drying. The reaction yield obtained under these conditions was 40%, showing that even at room temperature in presence of water the reaction of DAMP with cotton cellulose proceeds at a significant rate.

EXAMPLE III

A sample of 80 x 80 cotton fabric was padded at 90% wet pickup with a solution containing 7.5% 1,4-diacryloyl-2,5-dimethyl piperazine and 2.5% $KHCO_3$, dried, steamed for 10 minutes and washed. The weight increase due to treatment was 3.6%, showing a 57% reaction yield. The wet crease recovery of the treated sample was 242°, as compared to 161° for the untreated control. The treated sample did not shrink in the warp direction after 5 launderings at 140° F., while the untreated control washed simultaneously had 8% shrinkage.

EXAMPLE IV

A sample of plain weave rayon fabric was padded at 90% wet pickup with a solution containing 15% diacrylol N,N' dimethyl ethylene diamine and 2% NaOH, dried, cured for 5 minutes at 325° F. and washed. The weight increase due to treatment was 8.8%, showing a 64% reaction yield. The treated fabric did not shrink in laundering, while an untreated control shrank 17% in the warp direction after 5 launderings and tumble dryings. The tensile strength was not decreased by the treatment, and the wet crease recovery increased from a value of 167 for the untreated control to a value of 224 for the treated sample.

EXAMPLE V

Samples of 80 x 80 cotton printcloth fabric were padded at 90% wet pickup with aqueous solutions containing 10% dacrylic piperazine (DAP) and alkaline catalysts, dried, heated under various conditions and washed. The weight increase resulting from the treatment determined and the results obtained are summarized in the table below:

| Sample | Catalyst | Percent catalyst in treating solution | Heating conditions | Percent weight gain |
| --- | --- | --- | --- | --- |
| A | Benzyl trimethyl ammonium hydroxide. | 3 | 3 min. 300° F | 7.2 |
| B | do | 3 | 3 min. 325° F | 7.2 |
| C | do | 3 | 3 min. 350° F | 7.0 |
| D | do | 3 | Steamed 5 min | 8.3 |
| E | do | 3 | Steamed 10 min | 8.5 |
| F | $KHCO_3$ | 6 | 3 min. 325° F | 6.7 |
| G | NaOH | 3 | 3 min. 325° F | 6.3 |

The properties of the treated cotton samples were as follows:

| Sample | W+F crease recovery | | Wash/wear rating (5L) after tumble drying | Percent shrinkage after 5 launderings | |
| --- | --- | --- | --- | --- | --- |
| | Dry | Wet | | W | F |
| A | 256 | 244 | 3.8 | 0.0 | 0.5 |
| B | 248 | 246 | 4.0 | 0.5 | 1.0 |
| C | 246 | 261 | 4.5 | 0.5 | 0.5 |
| D | 256 | 258 | 4.5 | 0.0 | 0.5 |
| E | 254 | 271 | 4.8 | 0.5 | 0.5 |
| F | 258 | 255 | 4.5 | 1.0 | 0.5 |
| G | 255 | 246 | 4.0 | 0.0 | 1.0 |
| Untreated | 148 | 164 | 1.0 | 7.0 | 4.5 |

The treated samples had excellent appearance and handle. The damage due to retained chlorine was zero for all treated samples.

EXAMPLE VI

Samples of plain weave rayon fabric were padded at 100% wet pickup with a solution containing 10% DAP and 3% KOH. They were dried, heated as indicated in the table below, and washed. The reaction yield was calculated from the weight increase. The properties of the treated rayon were tested. The results obtained are summarized in the table.

| Sample | Heat treatment | Percent Yield | W+F wet crease recovery | Lbs. tensile Str. (W) | Percent Shrinkage after 5 ldgs. | |
| --- | --- | --- | --- | --- | --- | --- |
| | | | | | W | F |
| A | 3 min. 325° F | 66 | 238 | 47 | 1.5 | 2.0 |
| B | 5 min. 325° F | 61 | 228 | 46 | 0.5 | 1.5 |
| C | Steamed 10 min | 89 | 234 | 53 | | |
| D | Steamed 20 min | 93 | 228 | 48 | | |
| Untreated | | | 162 | 51 | 15.0 | 10.5 |

EXAMPLE VII

The resistance to hydrolysis of fabric samples treated with DAP was outstanding. Samples prepared as described in Example V (Sample G) were heated for 3 hours at 140°–150° F. while immersed in acid (0.5 Normal $H_2SO_4$) and alkaline solutions (0.25 Normal NaOH). After the acid treatment, the crease recovery and the nitrogen content of the sample were unchanged, showing that the crosslinks formed in the reaction were stable to acid hydrolysis even under the severe conditions employed. After the alkali treatment, the crease recovery recreased only very slightly (by about 10 degrees), and the sample retained 80% of the nitrogen content present before the alkaline hydrolysis. While resistance to acid hydrolysis or to alkaline hydrolysis can be obtained by suitable choice of crosslinking agents, the resistance to both acid and alkaline hydrolysis is believed to be a unique feature of the crosslinking processes claimed in the present invention.

Another important property of cotton fabrics treated according to the crosslinking processes of the present invention is that the loss in tear strength which normally accompanies crosslinking sreatments in absence of additives is significantly less than for other processes. For example, with many other treatments the warp tear strength of 80 x 80 cotton fabric is decreased from a value of 1.8 pounds for the untreated fabric to about 1.0 pounds for crosslinked samples having a dry crease recovery of about 240°. Samples of 80 x 80 cotton fabric treated with diacrylic piperazine and having a dry crease recovery of about 240° have a wrap tear strength of 1.3–1.4 lbs., or 30 to 40% higher than obtained with other crosslinking agents at comparable level of crease recovery improvement.

The foregoing examples illustrate the method of the present invention for the chemical modification of cellulosic materials and although the examples emphasize the treatment of cotton and rayon (regenerated cellulose) fabric, it is to be understood that cellulose materials as referred to hereinabove include other cellulose textiles such as linen. Similarly, the cellulosic materials can be treated in the form of loose fibers, mats, non-woven assemblies, yarns and knitted or woven fabrics as well as other forms.

What is claimed is:

1. A method for the chemical modification of fibrous cellulosic materials in order to impart the desirable properties thereto which comprises applying to said cellulosic materials under alkaline conditions a tertiary bis-acrylamide compound selected from the group consisting of:

(I) 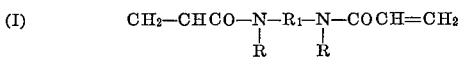

wherein
R is a lower alkyl group from 1 to 5 carbon atoms.
$R_1$ is selected from the group consisting of:

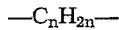

wherein $n$ is an integer with a value of 2 to 10;

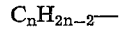

wherein $n$ has a value from 4 to 10;

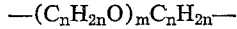

wherein
$m$ has a value of 1 to 5, and
$n$ has a value of 2 to 3;

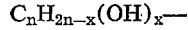

wherein
$x$ has a value from 1 to 5, and
$n$ has a value of three to 10; and

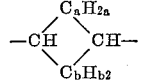

wherein $a$ and $b$ are integers with a value of 2 to 4; and (II) 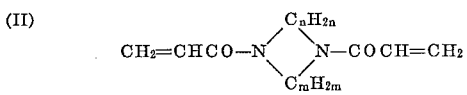

wherein $m$ and $n$ have a value of 2 to 4, and reacting to crosslink the cellulose molecules.

2. A method as defined in claim 1 wherein an alkaline metal compound is present in the form of a solution in a concentration of about 0.3% to 10% by weight based on the weight of the cellulosic material treated.

3. A method of claim 1 wherein the cellulosic textile material is a cotton fabric.

4. A method as defined in claim 1 wherein the cellulosic textile material is a regenerated cellulosic fabric.

5. A method as set forth in claim 1 wherein the reaction is carried out in the presence of steam.

6. A method for the chemical modification of fibrous cellulosic materials in order to impart desirable properties thereto which comprises applying to said cellulosic material under alkaline conditions a tertiary bis-acrylamide represented by the structural formula:

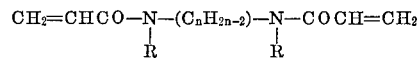

wherein
R is a lower alkyl group from 1 to 5 carbon atoms, and
$n$ is an integer with a value of 4 to 10, and reacting to crosslink the cellulose molecules.

7. A method for the chemical modification of fibrous cellulosic materials in order to impart desirable properties thereto which comprises applying to said cellulosic material under alkaline conditions a tertiary bis-acrylamide represented by the structural formula:

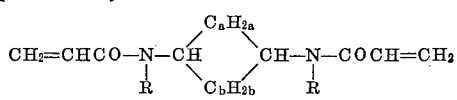

wherein
R is a lower alkyl group from 1 to 5 carbon atoms, and
$a$ and $b$ are integers with a value of 2 to 4, and reacting to crosslink the cellulose molecules.

8. A method for the chemical modification of fibrous cellulosic textile materials for imparting desirable properties thereto which comprises impregnating a cellulosic textile material with an aqueous solution of diacryloyl piperazine, as a crosslinking agent, in an amount of from 3 to 25% by weight based on the total weight of the cellulosic textile material treated and reacting said crosslinking agent with the cellulosic material by heating at a temperature of from about 200° F. to about 350° F. under alkaline conditions.

9. A method for the chemical modification of fibrous cellulosic textile materials for imparting desirable properties thereto which comprises impregnating a cellulosic textile material with an aqueous solution of 1,4-diacryloyl-2,5-dimethyl piperazine, as a crosslinking agent, in an amount of from 3 to 25% by weight based on the total weight of the cellulosic textile material treated anr reacting said crosslinking agent with the cellulosic material by heating at a temperature of from about 200° F. to about 350° F. under alkaline conditions.

10. A method for the chemical modification of fibrous cellulosic textile materials for imparting desirable properties thereto which comprises impregnating a cellulosic textile material with an aqueous solution of 1,4-diacryoloyl bis-N-methylamino cyclohexane, as a crosslinking agent, in an amount of from 3 to 25% by weight based on the total weight of the cellulosic textile material treated and reacting said crosslinking agent with the cellulosic material by heating at a temperature of from about 200° F. to about 350° F. under alkaline conditions.

11. A cellulosic textile material chemically modified with a tertiary bis-acrylamide compound as defined in claim 1.

References Cited

UNITED STATES PATENTS 3,016,281  1/1962  Kropa et al. _____ 8—116.2

OTHER REFERENCES

Frick et al.: Textile Research Journal, vol. 27, pp. 92–99 (1957).

GEORGE F. LESMES, Primary Examiner

J. CANNON, Assistant Examiner

U.S. Cl. X.R.

8—17, 30, 115.6, 120